US009172731B2

(12) United States Patent
Sung et al.

(10) Patent No.: US 9,172,731 B2
(45) Date of Patent: Oct. 27, 2015

(54) CALL PROCESSING SYSTEM AND METHOD BASED ON ANSWER MODE OF PUSH TO TALK OVER CELLULAR USER

(75) Inventors: Sang-Kyung Sung, Seoul (KR);
Joon-Goo Park, Yongin-si (KR);
Sung-Jin Park, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 1219 days.

(21) Appl. No.: 11/178,828

(22) Filed: Jul. 11, 2005

(65) Prior Publication Data

US 2006/0084454 A1 Apr. 20, 2006

(30) Foreign Application Priority Data

Sep. 24, 2004 (KR) ........................ 10-2004-0077172

(51) Int. Cl.
| | |
|---|---|
| *H04B 7/00* | (2006.01) |
| *H04L 29/06* | (2006.01) |
| *H04W 4/10* | (2009.01) |
| *H04W 72/00* | (2009.01) |
| *H04W 76/00* | (2009.01) |
| *H04W 80/10* | (2009.01) |

(52) U.S. Cl.
CPC ........ *H04L 65/4061* (2013.01); *H04L 65/1016* (2013.01); *H04L 65/608* (2013.01); *H04W 4/10* (2013.01); *H04W 72/005* (2013.01); *H04W 76/005* (2013.01); *H04W 80/10* (2013.01)

(58) Field of Classification Search
USPC ........................................................ 455/518
See application file for complete search history.

(56) References Cited

U.S. PATENT DOCUMENTS

| | | | |
|---|---|---|---|
| 2002/0061761 | A1 | 5/2002 | Maggenti et al. |
| 2002/0077136 | A1* | 6/2002 | Maggenti et al. ............. 455/518 |
| 2003/0016632 | A1 | 1/2003 | Refai et al. |
| 2004/0053619 | A1 | 3/2004 | Kim et al. |
| 2005/0276268 | A1* | 12/2005 | Poikselka et al. .......... 370/395.2 |

(Continued)

FOREIGN PATENT DOCUMENTS

| | | |
|---|---|---|
| CN | 1428058 | 7/2003 |
| CN | 1461574 | 12/2003 |
| JP | 09-121256 | 5/1997 |

(Continued)

OTHER PUBLICATIONS

Andrew Allen, "PoC Feature Tag Registration", Open Mobile Alliance, OMA-POC-2004-0733-CR-CP-Feature_Tag-Registration, Sep. 18, 2004.

(Continued)

*Primary Examiner* — Ankur Jain
(74) *Attorney, Agent, or Firm* — The Farrell Law Firm, P.C.

(57) ABSTRACT

A call processing system and method based on an answer mode of a Push-to-Talk over Cellular (PoC) user are provided. A data format is defined, which inserts an indicator indicating a manual answer override into a payload of a Real-time Transport Control Protocol (RTCP) in a format of a new data field. When a PoC communication requester instructs the MAO to perform PoC communication regardless of an answer mode of a reception side PoC user, an auto-answer mode is immediately executed without any procedure of checking the instruction. In addition, when the reception side PoC user establishes an early session with a home PoC server in its own PoC terminal, the call processing can be performed at a quicker speed.

5 Claims, 6 Drawing Sheets

(56) References Cited

U.S. PATENT DOCUMENTS

2007/0270104 A1* 11/2007 Allen et al. .................. 455/78
2008/0288643 A1* 11/2008 Suotula et al. ............... 709/227

FOREIGN PATENT DOCUMENTS

| JP | 2002-135854 | 5/2002 |
| WO | WO 00/74410 | 12/2000 |
| WO | WO 02/085050 | 10/2002 |
| WO | WO 02/085051 | 10/2002 |
| WO | WO 03/009617 | 1/2003 |
| WO | WO 2004/102977 | 11/2004 |
| WO | WO 2005/060501 | 7/2005 |

OTHER PUBLICATIONS

Sungjin Park et al., "Manual Answer Override Procedure", Open Mobile Alliance, OMA-PoC-2004-0565R02-CR_AD Manual Answer Override Procedure, Aug. 18, 2004.

* cited by examiner

FIG. 4

| 1 | PoC Address of invited PoC user |
|---|---|
| 2 | Media parameters given by PoC Client/Server |
| 3 | PoC service indication |
| 4 | PoC Address of the inviting PoC user at PoC Client |
| 5 | Controlling PoC function assigned indication |
| 6 | Talk burst control protocol proposal |
| 7 | Manual answer override request, if selected by PoC Client A |

FIG. 6

| Version | P | subtype | Packet type | length |
|---|---|---|---|---|
| SSRC / CSRC ||||||
| name (ASCII) ||||||
| PoC Address of sending PoC user | | | Display name of sending PoC user | |
| Manual answer override indication | | | other application dependent data 1 | |
| other application dependent data 2 ||||||

CALL PROCESSING SYSTEM AND METHOD BASED ON ANSWER MODE OF PUSH TO TALK OVER CELLULAR USER

CROSS-REFERENCE TO RELATED APPLICATION

This application claims priority under 35 U.S.C. §119 to an application entitled "Call Processing System and Method Based On Answer Mode of Push to Talk Over Cellular User," filed in the Korean Intellectual Property Office on Sep. 24, 2004 and assigned Serial No. 2004-77172, the contents of which are incorporated herein by reference.

BACKGROUND OF THE INVENTION

1. Field of the Invention

The present invention relates generally to a call processing system and method based on an answer mode of a PoC (Push-to-Talk over Cellular) user.

2. Description of the Related Art

With the development of mobile communication systems and the expansion of mobile communication networks, mobile phone services and applications have diversified and expanded accordingly. For example, although mobile communication systems were originally only required to provide simple communication services (e.g., voice-only communication services), mobile communication systems today provide diversified services (e.g., location services, a multimedia services, PTT (Push-to-Talk) services, etc).

Currently, PTT services include various additional functions such as an instant messenger function, a status indication function, etc., in addition to existing voice communication functions which are provided by radio sets, TRSs (Trunked Radio Systems), etc.

Currently, efforts are being made to enact a standard for a PTT over Cellular (PoC) service using a mobile communication network. The PoC service has various features which distinguish it from existing mobile communication services. For example, an OMA (Open Mobile Alliance), a group that defines specifications designed for mobile communication services, has set forth standards which specify that a user of a mobile communication device should be allowed to make a call while moving between a plurality of sessions.

Hereinafter, a structure of a general PoC service system will be described.

A block diagram illustrating a general PoC architecture is shown in FIG. 1. A PoC client 10 is a service requester that is mounted in a mobile phone, and is usually connected with a SIP/IP (Session Initiation Protocol/Internet Protocol) core 30 via an access network 20, wherein the SIP/IP core is a core element for supporting both SIP and IP multimedia.

Here, the PoC client 10 provides access to a PoC service while residing in a PoC user terminal. The PoC client's 10 main functions are establishing a PoC session, participating in an existing PoC session, and terminating the established PoC session. In addition, the PoC client 10 performs other functions such as creating and sending a talk burst, supporting an instant personal alert, performing authentication on obtaining access to the PoC service, and so forth. Hereinafter, unless otherwise indicated, the term "PoC client 10" refers to a PoC service subscriber.

The SIP/IP core is connected with a PoC server 60, a GLMS (Group List Management System) 50 and a presence server 70 in order to support the PoC service, thereby providing the PoC service.

Here, the PoC server 60 may perform a Controlling PoC Function (CF) for maintaining and managing the PoC session, a Participating PoC Function (PF) for participating in the PoC session which is established for a one-to-one communication or a many-to-many communication, and so forth.

To be specific, the CF maintains and manages the PoC sessions, and the PF takes charge of maintenance and management of each PoC session. Moreover, although the CF and the PF are different functions which are performed by the PoC server, the PoC server may perform the CF and the PF at the same time. The CF and the PF will be described in more detail with reference to Table 1 and Table 2.

TABLE 1

| Controlling PoC Function (CF) |
|---|
| Provides centralized PoC session handling |
| Provides the centralized Media distribution |
| Provides the centralized Talk Burst Arbitration functionality including talker identification |
| Provides SIP session handling, such as SIP session origination, termination, etc. |
| Provides policy enforcement for participation in group sessions |
| Provides the participants' information |
| Collects and provides centralized media quality information |
| Provides centralized charging reports |
| May provide transcoding between different codecs |
| Support Talk Burst Control Protocol Negotiation |

As illustrated in Table 1, the CF manages PoC sessions on the whole, particularly to receive, sequence and authorize right-to-speak (i.e., a floor) requests of the PoC clients, to distribute a talk burst requested by an arbitrary PoC client to all the other PoC clients participating in a group calling, and to provide information about the PoC clients participating in the group calling.

As in Table 2, the PF serves to manage the PoC session connected with the CF and each PoC client, particularly, to relay a floor when the PoC client requests the floor or when the CF assigns the floor to the PoC client. Further, the PF serves; (1) to relay media between the CF and the PoC client; (2) to perform transcoding when different codecs are used between the CF and the PoC client; and (3) when two simultaneous sessions are established, for example when a PoC user is invited to the other session while participating in one session, to filter any one of the sessions according to selection of the PoC user.

TABLE 2

| Participating PoC Function (PF) |
|---|
| Provides PoC session handling |
| May provide the media relay function between PoC Client and Controlling PoC server |
| May provide user media adaptation procedures |
| May provide the Talk Burst control message relay function between PoC Client and Controlling PoC server |
| Provides SIP session handling, such as SIP session origination, termination, etc, on behalf of the represented PoC Client. |
| Provides policy enforcement for incoming PoC session (e.g. access control, incoming PoC session barring, availability status, etc) |
| May collect and provide media quality information |
| Provides the participant charging reports |
| May provide filtering of the media streams in the case of simultaneous sessions |
| May provide transcoding between different codecs |
| May support Talk Burst Control Protocol Negotiation |
| Stores the current Answer Mode and Incoming PoC Session Barring preferences of the PoC Client |

In the PoC system configured as mentioned above, a certain PoC user can input information on groups of other PoC users and their members into the GLMS 50 by means of the terminal of the PoC user, or can ascertain information about the other PoC users who can be called out through an individual or group list received from the GLMS 50. Moreover, another method capable of generating, correcting and managing the groups and their members at the GLMS can input such information through a communication network, such as the Internet, an intranet or so forth.

In order to make use of a PoC calling service, the PoC user registers his/her PoC address with the SIP/IP. At this time, the SIP/IP core stores information on the PoC user on the basis of a request of the PoC user. Therefore, when another PoC user attempts a PoC group calling, the other PoC user registers its own information with the SIP/IP core in advance as set forth above, and provides a request for the calling to the SIP/IP core by using the group identification information received from the GLMS. Here, the SIP/IP core goes through the processes of determining the address and positioning a domain by using the information about the requesting PoC user, and then sends a request for PoC communication to a home PoC server with which the requesting PoC user is registered. The PoC server prepares an opening of the PoC session with regard to the PoC communication request, obtains information about each PoC user from a GLMS server, and sends a communication request signal to the corresponding SIP/IP core. At this time, in the case of the communication request of the users within an intra-domain, the PoC server performs the PF and the CF. The PoC server managing the PoC user provided with the communication request goes through the process of locating the SIP/IP core by using the information about the PoC user which is sent to the PoC server, and then makes the communication request to the PoC user.

Hereinafter, the call processing for a PoC communication setup will be described according a reception-side viewpoint and a transmission-side viewpoint. Features of the PoC system which are required according to the OMA for each of the reception and transmission side setups are as follows. First, an answer mode can be set according to a request of the PoC user. The answer mode can be generally divided into an auto-answer mode and a manual answer mode.

In the auto-answer mode, when a certain sender is included in a list of the PoC users designated to make an auto-answer on the reception side, an auto-answer is immediately sent to the transmission side in the network instead of a manual answer of a receiver.

Meanwhile, the manual answer mode is applied when the sender is not included in the list of PoC users for the auto-answer, when the sender is not known or when the receiver is set to manually answer all the PoC users, which means that a PoC communication request is sent to a user's terminal via a receiving network, and thereby the communication is connected by permission of the PoC user. Here, each of the answer modes and list information are set and stored in the PoC server belonging to a home network of each of the respective PoC users.

Second, the PoC system is divided into an on-demand session mode and a pre-established session mode according to whether the PoC client is connected with a PoC server within the home network of the PoC user.

The pre-established session mode means that the PoC user establishes a specific session in advance (i.e., establishes an early session) between the PoC client and the PoC server belonging to the user's home network at the request of the user. This pre-established session is required for a fast communication setup. To this end, the PoC user previously negotiates with the PoC server to define server-client media parameters that the PoC user intends to use, so that it is unnecessary to re-negotiate at a later time and set server-client media parameters to be used in the future. In order to establish the early session, the PoC client provides the media parameters supported to a Session Description Protocol (SDP) body through an SIP INVITE method, and makes a response to the media parameters provided from the server, thereby returning, to the PoC user, identification information of the early session which is newly set to the response message from the server together with a conference URI (Uniform Resource Identifier). In the case of making use of this early session, it is possible to previously set an IP address, a port number, a talk burst control protocol for controlling a codec, and a talk burst that are to be used, and so forth.

The on-demand session mode refers to a state where the PoC user does not establish the early session, and means that the PoC user receives an INVITE message of another PoC user to then perform a PoC call connecting procedure.

Meanwhile, the PoC specification that is being standardized by the OMA includes the following special features except the basic functions of the communication system as mentioned above.

First, the PoC system supports a function of a Manual Answer Override (hereinafter referred to as "MAO") which sends an auto-answer to an authorized PoC user which is previously set by a PoC receiver (or a reception side PoC user) regardless of the answer mode of the PoC receiver and connects communication at a receiving terminal. A request of the MAO is supported only to an authorized communication requester, and is sent with an MAO indication included in a PoC communication request message (or INVITE). This MAO request is devised for public services and for emergency services (e.g., police, fire, accident, disaster relief, other emergencies, etc.)

Moreover, the PoC system allows both the PoC server as an element on a network and the PoC client as a terminal of the user side, to set the answer mode to the communication request.

When being set in the network, the answer mode is implemented at the PoC server that performs the PF within a home network to which the PoC client belongs. In this case, it is characterized in that the communication requesting procedure can be simplified as compared with the case wherein the answer mode of the PoC client is reflected on the PF which is connected to the PoC client, and then an answer is made.

Finally, the PoC user can set the answer mode by using its own client. At this time, it is characterized in that the answer mode of the PoC user's own client has priority over the answer mode set on the network. This is for solving a privacy problem which occurs when the PoC user changes its own answer mode by using the terminal to request the PoC server to update the answer mode, particularly when the answer mode is not reflected in real time due to a signal delay or error in a radio access network or an IP core network. In order to solve this privacy problem, the PoC service can set the answer mode of the user for both the PoC server and the PoC client, and the PoC server and the PoC client perform operations as determined by the answer mode of the PoC client which complies with a user's desires.

Depending upon various functions and features of the PoC system, the call processing may be variously performed. Particularly, in the present invention, when the pre-established session is provided on the PoC call reception side and when the one-to-one communication of requesting the MAO on the PoC transmission side is requested, the process and or method for complying with the call request and performing the call processing is performed.

In reality, requesting the MAO on the PoC transmission side is usually occurs during emergency situations. In the process of actually requesting the MAO on the PoC transmission side, unnecessary steps are performed, which causes an unnecessary time delay. This unnecessary time delay will now be discussed with reference to the transmission side and to the reception side of conventional systems.

A flow chart illustrating a conventional process of setting a reception side PoC communication for an MAO is shown in FIG. 2, and a flow chart illustrating a conventional process of setting a transmission side PoC communication for an MAO is shown in FIG. 3. As shown in FIGS. 2 and 3, call processing procedures of call transmission and reception sides are illustrated for a conventional communication system in which a PoC communication sender makes a request for call processing based on an MAO indication and when an early session is established on the reception side.

With reference to FIG. 2, a PoC client A sends an INVITE request to a SIP/IP core A, wherein the INVITE request includes information on a SIP address of a receiver which the PoC client A wants to invite (Step 101).

Here, the INVITE request includes an information element indicating the MAO, and is sent to a Participating PoC server A via the corresponding servers (P-CSCF (Proxy-Call Session Control Function) and S-CSCF (Serving-Call Session Control Function)) within an IMS core network by means of a query about a path in a DHCP (Dynamic Host Configuration Protocol) server or a DNS (Domain Name System) server (Step 102).

On making a request for a general call, the Participating PoC server connected with a PoC user may be separated from a Controlling PoC server for managing a talk burst of an opened session. Hence, the INVITE request sent in Steps 101 and 102 is sent to a Controlling PoC server X via a SIP/IP core of each network (Steps 103 to 105).

The Controlling network including a CF (not shown) sends the INVITE message sent in Step 105 to the corresponding SIP/IP core, and then receives a response message. A SIP response message from the reception side network may be a provisional response message, a successful response message, or an error message. These messages each comprise a 3-digit code. For example, the provisional response message comprises a 3-digit code beginning with a 1 such as 1xx; the successful response message comprises a 3-digit code beginning with a 2 such as 2xx; and the error response messages comprise a 3-digit code beginning with a 4, a 5, or a 6 such as 4xx, 5xx and 6xx. These codes are described below with reference to Table 3.

However, within the fundamental spirit and scope of the present invention, the normal call processing procedure will be mainly described.

TABLE 3

| | Response Status Code | |
|---|---|---|
| Informational | 100 | Trying |
| | 180 | Ringing |
| | 181 | Call Is Being Forwarded |
| | 182 | Queued |
| | 183 | Session Progress |
| Success | 200 | OK |
| Redirection | 300 | Multiple Choices |
| | 301 | Moved Permanently |
| | 302 | Moved Temporarily |

TABLE 3-continued

| | Response Status Code | |
|---|---|---|
| | 305 | Use Proxy |
| | 380 | Alternative Service |
| Client-Error | 400 | Bad Request |
| | 401 | Unauthorized |
| | 402 | Payment Required |
| | 403 | Forbidden |
| | 404 | Not Found |
| | 405 | Method Not Allowed |
| | 406 | Not Acceptable |
| | 407 | Proxy Authentication Required |
| | 408 | Request Timeout |
| | 409 | Conflict |
| | 410 | Gone |
| | 413 | Request Entity Too Large |
| | 414 | Request-URI Too Large |
| | 415 | Unsupported Media Type |
| | 420 | Bad Extension |
| | 480 | Temporarily not available |
| | 481 | Call Leg/Transaction Does Not Exist |
| | 482 | Loop Detected |
| | 483 | Too Many Hops |
| | 484 | Address Incomplete |
| | 485 | Ambiguous |
| | 486 | Busy Here |
| | 487 | Request Terminated |
| | 488 | Not Acceptable Here |
| Server-Error | 500 | Internal Server Error |
| | 501 | Not Implemented |
| | 502 | Bad Gateway |
| | 503 | Service Unavailable |
| | 504 | Server Time-out |
| | 505 | SIP Version not supported |
| Global-Failure | 600 | Busy Everywhere |
| | 603 | Decline |
| | 604 | Does not exist anywhere |
| | 606 | Not Acceptable |

After Step 105, the CF of the controlling network may receive an auto-answer or a manual answer, particularly an OK response. Alternatively, in the case of the auto-answer as in FIG. 2, a 183 Session Progress signal (the provisional response signal) (not shown) may be received, and thereby a connection between the PoC server and the PoC client may be performed in the IMS network of the communication requester. A communication permission signal of the receiver responds with the final OK response, and is sent to the PoC client A via the CF and the PF of the PoC server (Steps 106 to 110). Meanwhile, the CF receives an OK response signal of the receiving client, and then determines that a PoC communication is connected. As a result, the CF sends a Floor granted signal that assigns a talk burst floor to the PoC client A.

The PoC client A receives the OK response and Floor granted signals with respect to the INVITE request signal, and then sends a Send talk burst signal first by using a RTCP (Real-time Transport Control Protocol), wherein the Send Talk Burst signal indicates that a user of the PoC client sends the talk burst prior to making the user hear a ring back tone. Here, the Send Talk Burst signal includes information including a PoC address, a display name etc., of the transmission side PoC client. Because the Send Talk Burst signal makes use of a path of a media bearer, it can be sent without passing through the SIP/IP core network.

After sending the Send talk burst signal, the PoC client informs the user of the communication connection and sends media (typically, a voice) of the user by using the RTP.

FIG. 3 is a flow diagram illustrating a reception side call processing procedure according to the prior art when an early session is established which corresponds to a transmission side communicating procedure and an MAO request is sent.

A procedure where the INVITE message including the MAO request is sent to the PoC server belonging to a home network of the reception side PoC client via the SIP/IP core according to the call processing procedure of the IMS network is shown in Steps 201, 202 and 203.

At this time, a Participating PoC server B may have a setting value of its own answer mode, i.e., has a parameter of any one of its own auto- and manual-answer modes. However, the Participating PoC server B checks an MAO indication in the INVITE request message, and then sends an auto-answer message to the call request network (Steps 204, 205 and 206).

In general, this auto-answer message is the SIP message called the "183 Session Progress" as mentioned above, which is sent to a Controlling network. The Participating PoC server B sends an INVITE or re-INVITE request message to the PoC client having the corresponding PoC address which was sent in Steps 204, 205 and 206 (Steps 207 and 208). Steps 207 and 208 serve to inform the PoC client that a PoC call request of making a request for the MAO is received. The PoC client B then automatically sends an OK response without confirmation by the PoC user (Steps 209 and 210).

The Participating PoC server B receiving the corresponding OK response sends a response message responding to the MAO INVITE to the transmission side network to complete the PoC call processing procedure (Steps 211 to 215). The PoC Server X sends a Receiving talk burst signal to PoC Server B (Step 217). The PoC server B then sends the Receiving talk burst signal to the PoC client B, wherein the Receiving talk burst signal includes the PoC address and display name of a person who makes the PoC communication before the PoC client sends the media (Step 217).

Finally, the media (voice) sent on the transmission side is sent to the PoC client B by using the RTCP by means of the connected media bearer, so that the communication is initiated.

FIG. 4 is a table which illustrates information included in an INVITE request of a PoC call.

It can be seen that information elements included in the INVITE message requested on the transmission side include (1) PoC addresses of PoC call requester, (2) media parameter information presented at the client and server, (3) an indication informing a PoC service, (4) PoC addresses of PoC call receiver, (5) an indication set at the PoC server, (6) a talk burst control protocol to be negotiated with each other at both ends of the transceiving network and so forth, and (7) alternatively an MAO (Manual Answer Override) indication.

The procedure of processing the MAO communication request with respect to the client having the early session as set forth in the prior art includes the procedure of checking the MAO request indication at the PF to send the auto-answer, but it does not have a great influence on the final PoC communication connection between the transmission side network and client. In the procedure of processing the MAO communication request, after the OK response message received from the client arrives at the CF and the transmission side network, both connection of the media bearer and transmission of the Floor granted signal for making the actual PoC communication are performed.

However, the communication request message including the MAO is characterized in that it can be processed regardless of the answer mode of the reception side user, and has a function of sending the talk burst transport message by using the RTCP packet so as to display the PoC address information and display name before the media is sent to the reception side client. For this reason, the conventional procedure as shown in FIG. 2 cannot be referred to as an optimized procedure of the MAO call processing due to repetitive request-response signaling. In particular, for emergency and public use purposes, quick call processing is desirable.

SUMMARY OF THE INVENTION

Therefore, it is an object of the present invention to provide a call processing system and method based on an answer mode of a PoC user capable of simplifying a process of executing an MAO in order to accommodate situations when there is no time to lose, such as during emergencies. The call processing system and method of the present invention is based on an IP Multimedia Subsystem (IMS) network which is desirable for connecting a communication of a half duplex-type communication and a communication of the PoC system which enables instant communication according to a communication request by using presence information of a user.

In order to accomplish this objective, according to one aspect of the present invention, there is provided a call processing system based on a manual answer override (MAO) in a Push-to-Talk over Cellular (PoC) network. The call processing system includes a transmission side PoC system having a transmission side PoC client and a transmission side PoC server for sending a PoC communication request message to a reception side PoC server, the PoC communication request message including an MAO indication, and a reception side PoC system having the reception side PoC server for recognizing the MAO indication included in the PoC communication request message received from the transmission PoC server and sending a response message to the transmission PoC system in response to the PoC communication request message, and a reception side PoC client for receiving a talk burst signal including the MAO indication from the reception side PoC server.

According to another aspect of the present invention, there is provided a call processing method based on a manual answer override (MAO) in a Push-to-Talk over Cellular (PoC) network. The call processing method includes the steps of sending a PoC communication request message including an MAO indication from a transmission side PoC server to a reception side PoC server; recognizing, by the reception side PoC server, the MAO indication included in the PoC communication request message and sending a response message to the transmission PoC server in response to the PoC communication request message; and receiving, by a reception side PoC client, a talk burst signal including the MAO indication from the reception side PoC server.

According to yet another aspect of the present invention, there is provided a method for performing a manual answer override (MAO) in a Push-to-Talk over Cellular (PoC) network. The method includes the steps of: receiving a talk burst signal including an MAO indication from a PoC server; and detecting the MAO indication included in the talk burst signal, the MAO indication being first MAO information sent from the PoC server to a PoC client.

According to still another aspect of the present invention, there is provided a Push-to-Talk over Cellular (PoC) client for performing a manual answer override (MAO) in a PoC network. The PoC client receives a talk burst signal including an MAO indication from a PoC server and detects the MAO indication included in the talk burst signal, wherein the MAO indication is the first MAO information sent from the PoC server to the PoC client.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein:

FIG. 4 is a table which illustrates information included in an INVITE for a request of a PoC call;

FIG. 6 illustrates a payload format of a RTCP packet including an MAO indication in accordance with the present invention.

DETAILED DESCRIPTION OF THE INVENTION

Hereinafter, a push to talk over cellular user will be described with reference to the accompanying drawings.

Figure 1:
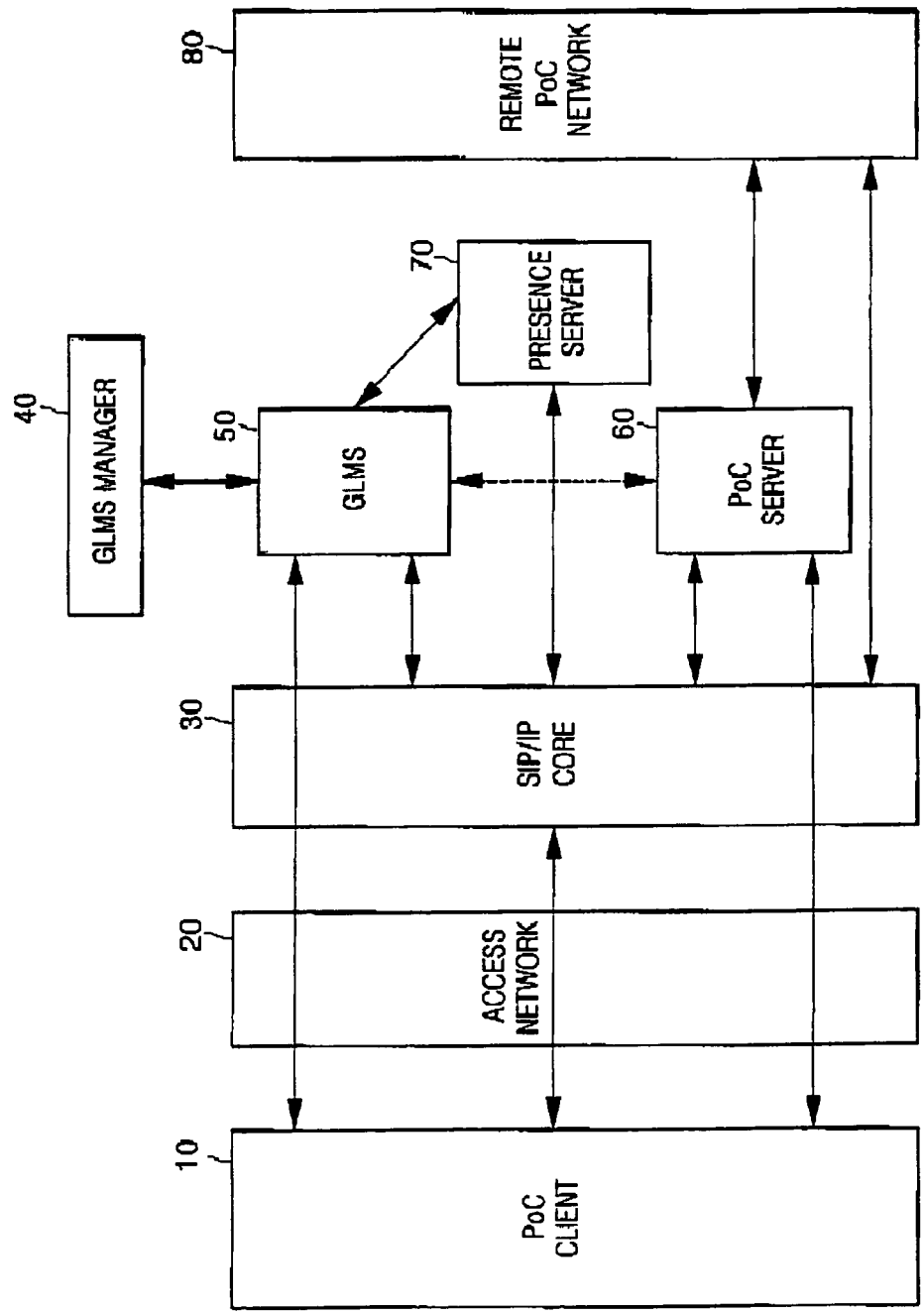
FIG. 1 is a block diagram illustrating a general PoC service system.
Figure 2:
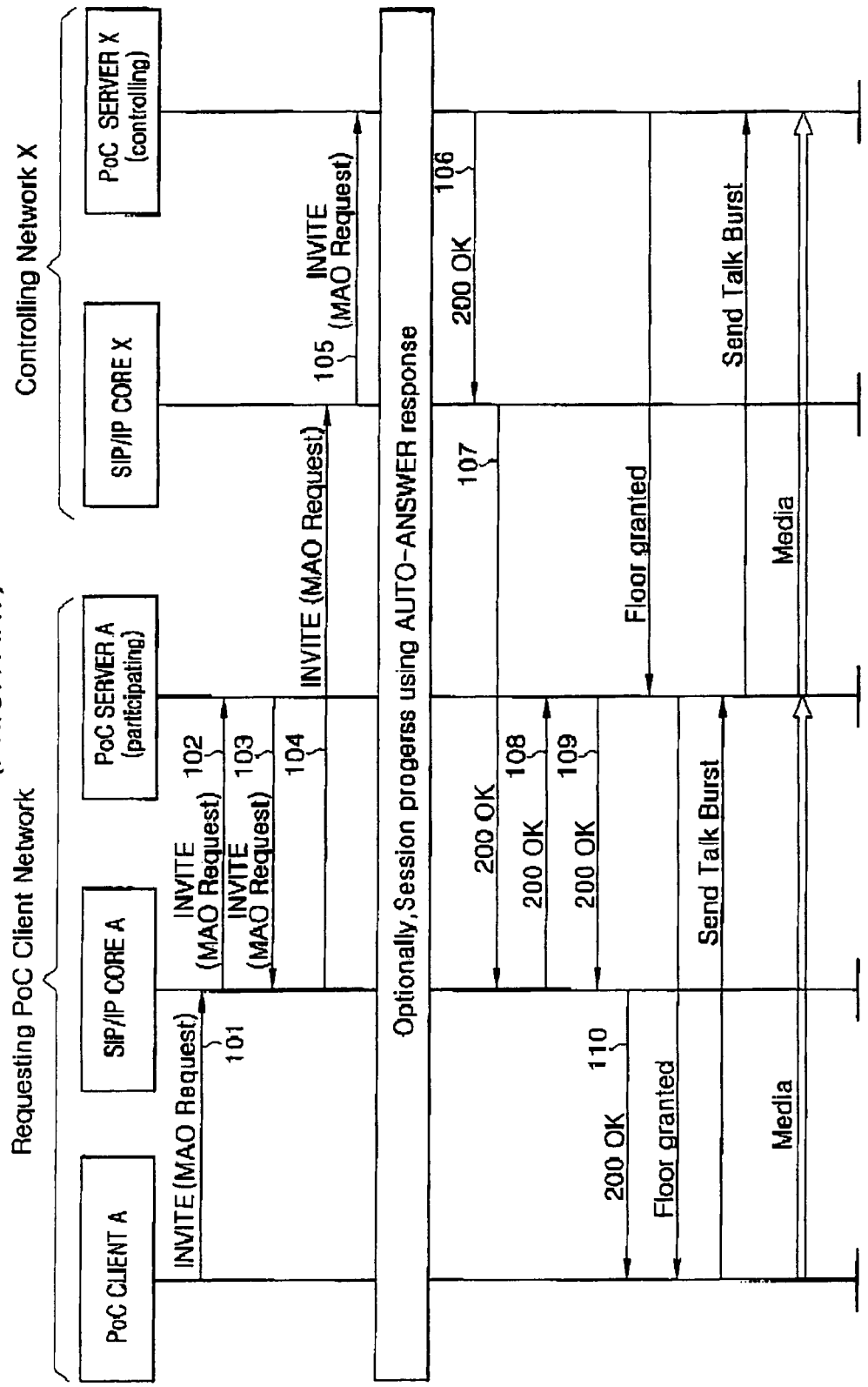
FIG. 2 is a flow chart illustrating a conventional process of setting a reception side PoC communication for an MAO.
Figure 3:
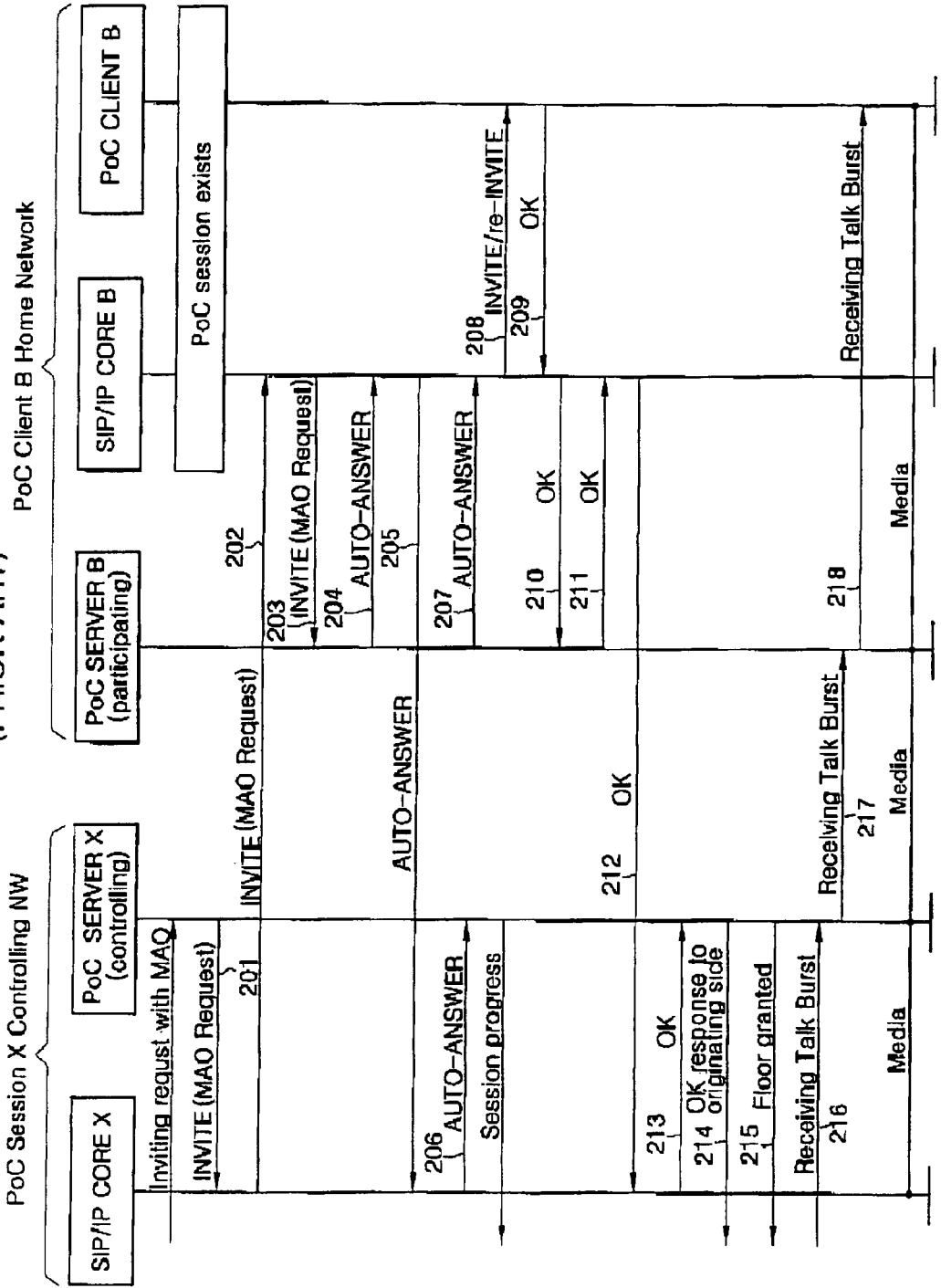
FIG. 3 is a flow diagram illustrating a conventional process of setting a transmission side PoC communication for an MAO.
Figure 5:
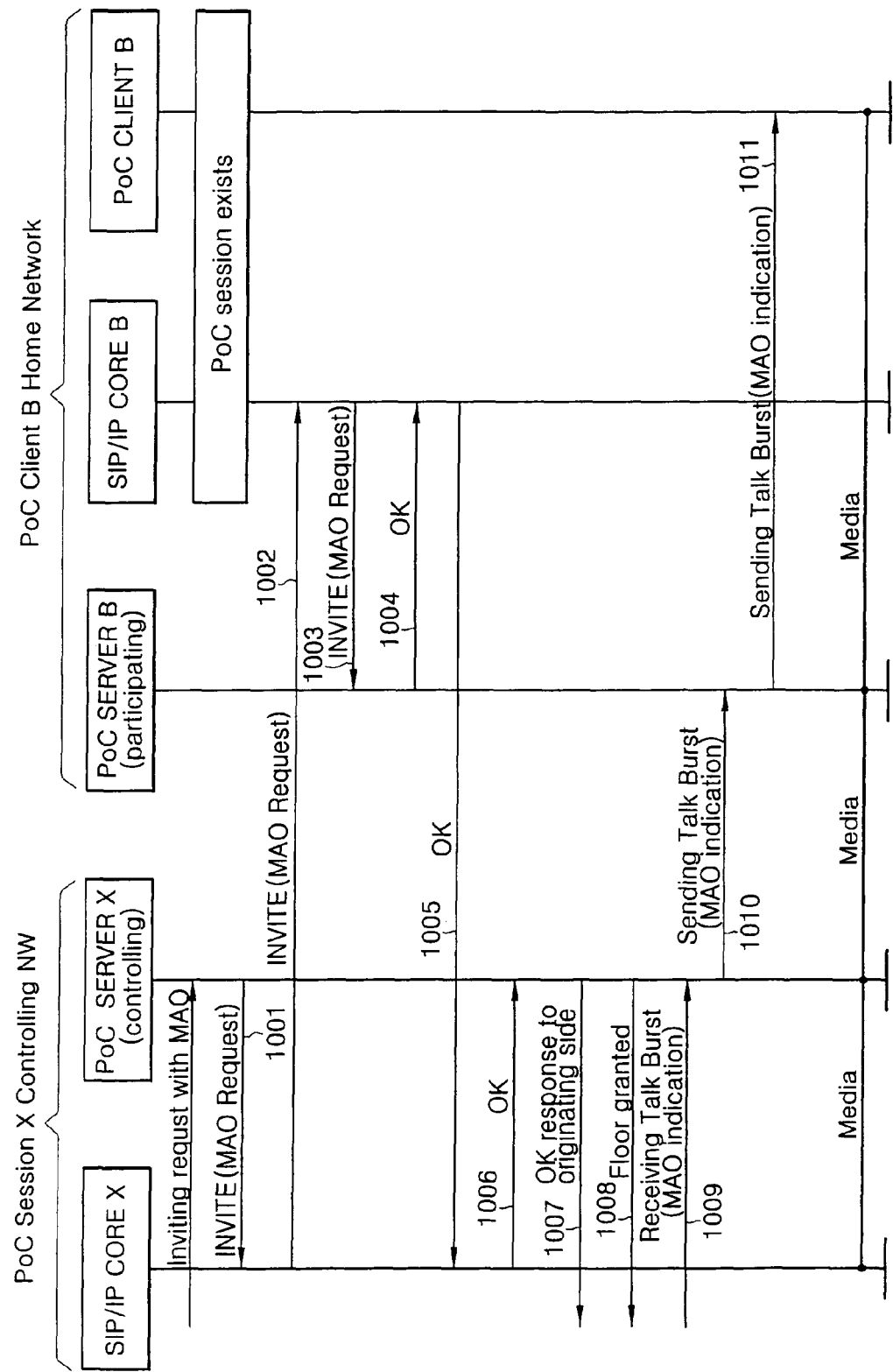
FIG. 5 is a flow diagram illustrating a process of setting improved PoC communication for an MAO according to the present invention.

FIG. 5 is a flow diagram illustrating a process of setting improved PoC (Push-To-Talk (PTT) over Cellular) communication for an MAO (Manual Answer Override) according to the present invention. As shown in FIG. 5, the circuit embodiment is directed to a procedure of processing an MAO communication request with respect to a PoC client in which a pre-established session exists, and shows a call processing procedure for PoC communication which is proposed in an embodiment of the present invention.

First, a Controlling PoC server receives an INVITE message including an MAO indication from a network of a PoC communication requester (or, a requesting PoC user) (Step 1000). Then, the INVITE message is sent through an SIP/IP (Session Initiation Protocol/Internet Protocol) core of a Controlling network and a SIP/IP core of a reception side home network (Steps 1001, and 1002, respectively) to a Participating PoC server belonging to the reception side home network of a PoC communication receiver (or, a receiving PoC user) (Step 1003).

At this time, the Participating PoC server processes information included in the INVITE message, such as a PoC address of the PoC communication receiver, a PoC address of the PoC communication requester and an MAO indication, and uses the processed information for the call processing.

Meanwhile, the Participating PoC server can determine that a session pre-established with the corresponding PoC user exists by using the address information, and recognizes the MAO indication to send an OK response signal in response to the INVITE request message regardless of an answer of the PoC user which is forwarded to the Controlling PoC Server via the SIP/IP of a reception side home network (Steps 1004 to 1006).

Then, the OK response signal returns to a route of the INVITE request message according to a routing rule of an IMS (IP Multimedia Subsystem) network.

The establishment of the auto-answer procedure of the steps 1004 to 1006 is possible because the Participating PoC server uses the pre-established session's media parameters which the Participating PoC server negotiates with the receiving PoC user in advance. Moreover, because the information of the MAO indication is used to predict that the PoC communication requester is an authorized user with respect to the corresponding PoC communication receiver, the reception side PoC client accepts the PoC communication request without reserve.

This predicted procedure is functionally compatible with requirements defined in the current OMA standard and user cases, and therefore there are no compatibility issues.

The above-mentioned OK response signal returns to the Controlling PoC server of the Controlling network, and then is sent to the home network of the PoC communication requester (Step 1007). At this time, from the viewpoint of the transmission side of the PoC communication, the OK response signal is recognized to be equal to what the receiving PoC user directly permits the PoC communication and returns to the PoC communication requester or the requesting PoC user. Thereby, a dialog is established to complete a SIP based communication procedure.

Meanwhile, both the OK response signal and the Floor granted signal are sent from the corresponding Controlling PoC server to the transmission side PoC client (not shown) (Steps 1007 and 1008). The transmission side PoC client then sends a talk burst transmission signal including a PoC address and a display name thereof and the MAO indication to a RTCP route (Step 1009). Finally, the Controlling PoC server of the Controlling network sends a talk burst transmission signal including the MAO indication to the reception side PoC client via the reception side PoC server (Steps 1010 and 1011). At this time, the reception side PoC user recognizes that the user granted the MAO by the reception side PoC user requests the PoC communication (at this time, the name, the PoC address etc. of the communication requester may be displayed), and receives the media (voice signal) that is sent immediately.

FIG. 6 illustrates a payload format of a RTCP packet including an MAO indication in accordance with the present invention. A configuration of a RTCP packet that the transmission side PoC client sends may be implemented in a payload format of the RTCP packet. The payload of the RTCP packet includes general transmission-related information such as version information, subtype information, length, etc. and MAO indication information inclusive of the PoC address and name of the PoC user.

It should be noted that, in another embodiment of the present invention, a step of including the MAO indication may be performed by the transmission side PoC client belonging to the user terminal as mentioned above, but the MAO indication can be performed by the Controlling PoC server of the Controlling network or the receiving PoC server of the reception side home network.

Meanwhile, according to use of the pre-established session, a route between the PoC server and client and additional resource reservation may be included. However, because the route and the resource reservation depart from the gist of the present invention, they will not be described herein. The requirements for the pre-established session which are requested in the present invention do not influence the pre-established session, but they can be more easily realized according to the expanded definition of the pre-established session.

As set forth above, the PoC system provides various functions and features, for example various PoC call processing procedures. In particular, when the early session is established on the reception side for the PoC communication and when the one-to-one communication of asking for the MAO is requested on the transmission side for the PoC communication, the request for communication is accepted to perform the PoC call processing. The present invention proposes the PoC call processing procedure and method which constitutes an improvement upon the conventional procedure and method.

In general, the request for MAO is used for emergency communications, public services and so forth. As such, the MAO request is a service which requires the fastest procedure for PoC call processing.

According to the present invention, with regard to this MAO request, a simple data field is added by using the RTCP, thereby guaranteeing relatively fast communication processing. As a result, an improved service can be provided in the aspect of the PoC user, and a communication resource can be efficiently managed by reduction of additional signaling in the aspect of the service provider. In particular, because an answer mode is not synchronized between the PoC user terminal and the PoC server, a fast communication processing method can be implemented regardless of the generated race condition (where a race condition is defined as an inconsistency between an answer mode status set in a PF and a terminating PoC client.

While the present invention has been described with reference to exemplary embodiments thereof, it will be understood by those skilled in the art that various changes in form and detail may be made therein without departing from the spirit and scope of the present invention as defined by the following claims.

What is claimed is:

1. A call processing method in a Session Initiation Protocol (SIP) based network involving at least one Push-to-Talk (PTT) over Cellular (PoC) client and a PoC server, the call processing method by a reception side PoC client comprising:
   establishing, by the reception side PoC client, a session between the reception side PoC client and the PoC server during which media parameters that the reception side PoC client intends to use are negotiated between the reception side PoC client and the PoC server;
   receiving, at the reception side PoC client, a talk burst signal including a Manual Answer Override (MAO) indication from the PoC server when a call connection is established with a transmission side PoC client by the PoC server after the session between the reception side PoC client and the PoC server is established;
   detecting, by the reception side PoC client, the MAO indication which establishes an auto-answer mode in the established session;
   establishing, by the reception side PoC client, an answer mode set in the reception side PoC client as the auto-answer mode according to the detected MAO indication and the media parameters that were previously negotiated between the PoC server and the reception side PoC client; and
   outputting, from the reception side PoC client, a PoC communication request including the MAO indication transmitted from the transmission side PoC client,
   wherein the MAO indication is used to determine that the transmission side PoC client is an authorized user with respect to the reception side PoC client, and
   wherein the talk burst signal is implemented in a payload format of a Real-time Transport Control Protocol (RTCP) packet that includes a version information field, a subtype information field, a length field, a general transmission related information field, a PoC user address field, a name information field, and an MAO indication information field.

2. The call processing method by the reception side PoC client according to claim 1, wherein outputting the PoC communication request further comprises:
   displaying information relating to a PoC communication requester including at least one of a name of the transmission side PoC client and an address of the transmission side PoC client on a display of the reception side PoC client.

3. A reception side Push-to-Talk over Cellular (PoC) client for performing a Manual Answer Override (MAO) in a Session Initiation Protocol (SIP) based network, comprising:
   a processor for establishing a session between the reception side PoC client and a PoC server during which media parameters that the reception side PoC client intends to use are negotiated between the reception side PoC client and the PoC server;
   a transceiver for receiving a talk burst signal including an MAO indication from the PoC server when a call connection is established with a transmission side PoC client by the PoC server after the session between the reception side PoC client and the PoC server is established;
   wherein the processor detects the MAO indication which establishes an auto-answer mode in the established session;
   establishes an answer mode set in the reception side PoC client into the auto-answer mode according to the detected MAO indication and the media parameters that were previously negotiated between the PoC server and the reception side PoC client; and
   outputs a PoC communication request including the MAO indication transmitted from the transmission side PoC client,
   wherein the MAO indication is used to determine that the transmission side PoC client is an authorized user with respect to the reception side PoC client,
   wherein the talk burst signal is implemented in a payload format of a Real-time Transport Control Protocol (RTCP) packet that includes a version information field, a subtype information field, a length field, a general transmission related information field, a PoC user address field, a name information field, and an MAO indication information field.

4. The reception side PoC client according to claim 3, further comprising:
   a display for displaying information relating to a PoC communication requester including at least one of a name of the transmission side PoC client and an address of the transmission side PoC client.

5. The reception side PoC client according to claim 3, wherein the processor outputs information indicating that the PoC communication is requested from the transmission side PoC client authorized to use the MAO indication according to the detection of the MAO indication.

* * * * *